Nov. 7, 1933.  W. O. OSBON  1,934,322

CATHODE RAY OSCILLOSCOPE

Filed June 10, 1932

WITNESSES:

INVENTOR
William O. Osbon
ATTORNEY

Patented Nov. 7, 1933

1,934,322

UNITED STATES PATENT OFFICE 1,934,322

CATHODE RAY OSCILLOSCOPE

William O. Osbon, Wilkinsburg, Pa., assignor to Westinghouse Electric & Manufacturing Company, East Pittsburgh, Pa., a corporation of Pennsylvania Application June 10, 1932. Serial No. 616,488

13 Claims. (Cl. 171—95)

My invention relates to cathode-ray oscilloscopes and particularly to an improved oscillator for supplying a timing wave to the cathode-ray tube.

An object of my invention is to provide an oscillator which will supply a timing wave so shaped that the time axis of the curve on the oscilloscope screen is linear, whereby the voltage or current wave appearing on the screen will appear in rectangular coordinates.

A further object of my invention is to provide an oscillator which supplies a timing wave in which the linear portion of each cycle is a large percentage of the complete cycle.

A further object of my invention is to provide an oscilloscope in which the timing wave oscillator may easily be synchronized with the wave to be studied so that the latter wave will appear stationary on the fluorescent screen.

A still further object of my invention is to provide an oscillator which may be adjusted to supply timing waves of different frequencies so that the oscilloscope will be useful for studying the wave shapes of currents and voltages over a wide range of frequencies, and also so that either one cycle or a number of cycles of any one particular frequency may be reproduced on the fluorescent screen.

In practicing my invention, I employ a multi-vibrator as the timing wave oscillator. The usual multi-vibrator circuit is symmetrical and, in this form, it is unsatisfactory as a timing wave oscillator. I have found that by making the circuit unsymmetrical and by substituting a screen-grid tube for one of the usual grid leak resistors, as will be explained hereinafter, the multi-vibrator fulfills the requirements set forth in the objects of my invention.

Other features and advantages of my invention will appear from the following description taken in connection with the accompanying drawing in which.

Figure 1:
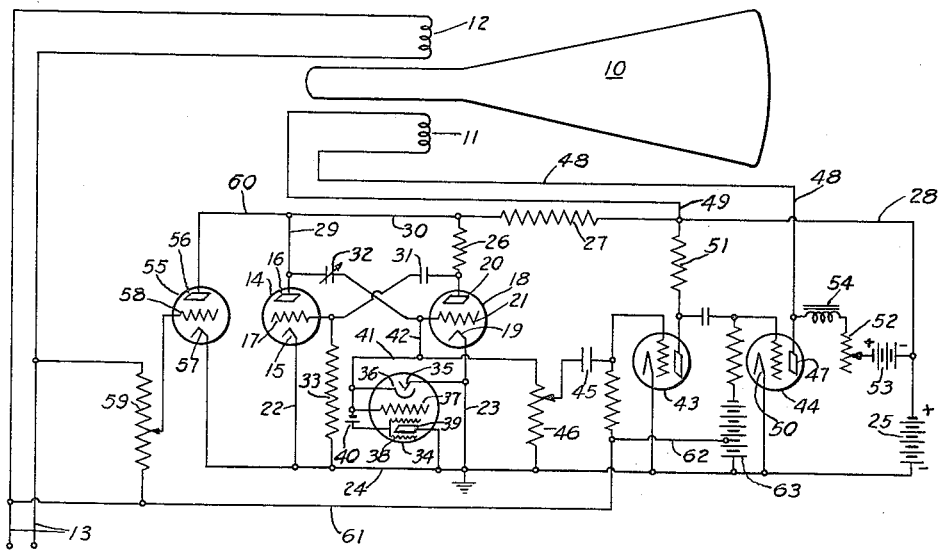
Figure 1 is a circuit diagram of an oscilloscope constructed in accordance with my invention.

Referring to Fig. 1, the oscilloscope comprises a cathode ray tube 10 which may be of any well known type. In this type of tube, the cathode beam is deflected relatively slowly in one plane by a deflecting coil 11 to give a time axis. The beam is deflected in a plane at right angles to the first plane by means of a deflecting coil 12 connected to an input circuit 13 upon which is impressed the voltage or current to be studied.

In order to deflect the cathode beam along the time axis at a uniform rate so that a linear time axis is obtained, the special multi-vibrator circuit constructed in accordance with my invention is provided.

This multi-vibrator comprises a vacuum tube 14 having a cathode 15, an anode 16, and a control electrode 17 and a similar vacuum tube 18 having a cathode 19, an anode 20 and a control electrode 21. The cathodes 15 and 19 are connected to ground through conductors 22, 23 and 24. The source of heating current for the cathodes is not shown. The anode 20 of the tube 18 is connected to the positive terminal of a B-battery 25 or other high voltage source through resistors 26 and 27 and a conductor 28. The anode 16 of tube 14 is connected to the same positive terminal of the B-battery 25 through conductors 29 and 30, the resistor 27 and the conductor 28. It will be noted that plate circuits of the tubes 14 and 18 are unsymmetrical, since the plate circuit of the tube 18 contains more resistance than does the plate circuit of the other tube.

The control electrode 17 of the tube 14 is coupled to the anode 20 of tube 18 through a coupling condenser 31. The control electrode 21 of tube 18 is connected to the anode 16 of tube 14 through a coupling condenser 32 which is variable for the purpose of adjusting the frequency of the multi-vibrator.

A grid-leak resistor 33 of the usual type is connected between the control grid 17 and the cathode 15 of the tube 14.

The grid-leak resistor for the tube 18 comprises a screen-grid tube 34 having a heating filament 35, a cathode 36, a control electrode 37, a screen grid 38 and an anode 39. The heating filament 35 is connected to ground and supplied with current from the same source as that supplying the multi-vibrator tube cathodes 15 and 19. The cathode 36 and control grid 37 are connected directly together and they are connected to the screen grid 38 through a battery 40 which maintains the screen grid positive with respect to the cathode and control grid. With the screen-grid tube connected as described, the plate current passed by it is substantially constant for all values of anode to cathode voltage above a certain small value.

The cathode 36, forming one terminal of the grid-leak resistor, is connected to the control grid 21 of the multi-vibrator tube through conductors 41 and 42. The anode 39 forming the other terminal of the grid-leak resistor, is connected to the cathode 19 of the multi-vibrator tube 18 by being connected directly to ground.

It will be apparent that the above described multi-vibrator circuit differs from the conventional multi-vibrator circuit in that the plate circuits are unsymmetrical, a screen-grid vacuum tube has been substituted for one of the grid-leak resistors, and one of the coupling condensers is variable.

Figure 2:
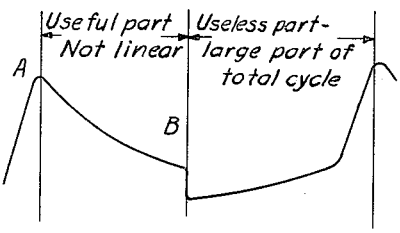
Fig. 2 is a view showing the form of the wave obtained from a symmetrical multi-vibrator of the usual type.
Figure 3:
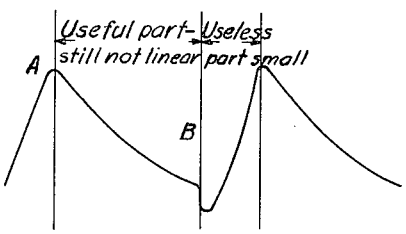
Fig. 3 shows the form of a multi-vibrator wave after the circuit has been made unsymmetrical.
Figure 4:
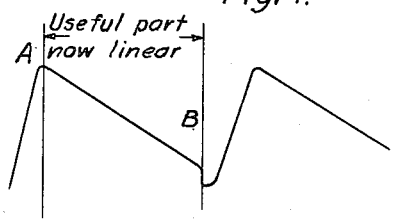
Fig. 4 shows the form of the wave of the unsymmetrical multi-vibrator after a saturated vacuum tube has been substituted for one of the usual grid-leak resistors.

The reasons for the above described modifications of the usual multi-vibrator will be understood by referring to Figs. 2, 3 and 4. The curve in Fig. 2 shows the wave form of the output of the usual symmetrical multi-vibrator. The only part of this wave that might be used as a timing wave for the oscilloscope is the portion between the points A and B. This portion of the curve is due to the discharge of a coupling condenser through a grid-leak resistor. It will be noted that this portion of the curve is not a straight line, and that it comprises less than half of the complete multi-vibrator cycle.

By making the multi-vibrator unsymmetrical by omitting one plate resistor, as I have done, the wave form is so changed that the useful portion of the curve comprises a large fraction of the complete cycle as shown in Fig. 3. However, this portion of the curve is still unsatisfactory for timing purposes because it is not a straight line. I have made this part of the curve a straight line as shown in Fig. 4 by employing the screen-grid tube 34 as one of the grid-leak resistors. It is evident that since the current flow through the screen-grid tube is constant, the coupling condenser 32 will discharge therethrough at a constant rate, the voltage across the condenser falling at a correspondingly constant rate, so that the voltage drop across the screen-grid tube decreases in a straight line with respect to time, as indicated in Fig. 4. It is this voltage drop that is applied to the deflecting coil 11.

It will be noted that the curve shown in Fig. 4 is that of a wave which is substantially "sawtooth" in shape.

The voltage drop across the condenser 32 instead of the drop across the tube 34 could be applied to coil 11 but the circuit illustrated is more satisfactory because one terminal of the screen-grid tube (anode 39) is grounded. Both terminals of condenser 32, on the other hand are above ground potential.

Tests of different tubes showed that the screen-grid tube connected as described above is the most satisfactory type to utilize as a substitute for the grid-leak resistor for tube 18 as its plate current is constant down to much lower voltages than is the case with any saturated two element tubes and thus gives a longer section of linear timing curve. A two element valve or tube saturates at about 50 volts while in a screen-grid tube connected as shown in Fig. 1, the plate current becomes substantially constant at about 1.5 to 2 volts. It was found that three element tubes having a positive grid have a satisfactory saturation curve at low filament currents but that the saturation curve varies greatly for slight changes in the filament current.

In one satisfactory embodiment of my invention the screen-grid tube was a UY-224, connected as shown in Fig. 1, having the screen-grid 1.5 volts positive with respect to the cathode.

Since the operation of a multi-vibrator is well known, it is not necessary to give a detailed explanation of the operation of this circuit. It may be stated, however, that the operation of the circuit depends upon the charging of the coupling condensers 31 and 32 and their discharging through the grid-leak resistors 33 and 34. The fundamental frequency of the multi-vibrator may be varied by changing the constants of the coupling condensers 31 and 32 or of the grid-leak resistors 33 and 34. In the example illustrated, the frequency is varied by changing the capacity of the coupling condenser 32.

The multi-vibrator output is supplied to the deflecting coil 11 through a conventional resistance coupled amplifier comprising vacuum tubes 43 and 44. The input circuit of this amplifier is connected across the cathode and anode of the screen grid tube 34 by means of a coupling condenser 45 and potentiometer 46.

The output circuit of the amplifier is connected to the deflecting coil 11 through a circuit which may be traced from the anode 47 of the tube 44 through a conductor 48, the deflecting coil 11, a conductor 49, the conductor 28 through the B-battery 25 to the cathode 50 of the tube 44.

It will be seen that the plate voltage is supplied to the tube 43 from the B-battery 25 through the conductor 28, and a resistor 51 and that the plate voltage is applied to the tube 44 through the deflecting coil 11 and circuit traced above.

By means of the variable resistor 52, the amount of direct current flowing through the deflecting coil 11 may be adjusted to the proper value to bring the cathode beam to the desired spot on the fluorescent screen. This control is obtained through a circuit which may be traced from the positive terminal of battery 53, through resistor 52, choke coil 54, conductor 48, coil 11, conductors 49 and 28, to the negative terminal of battery 53. Direct current flows through this circuit in opposition to the direct current component of the plate current of tube 44. By means of resistor 52 the value of this opposing current may be adjusted to an amount such that the direct current flowing through the coil 11 will be of the desired value. The impedance of choke coil 54 is high enough to cause the greater part of the alternating output of tube 44 to flow through the coil 11.

In order to make curves of recurrent phenomena appear stationary on the fluorescent screen, it is necessary to synchronize the waves of said phenomena with the timing wave. This may be done by impressing a portion of the recurrent voltage upon the multi-vibrator circuit. It must be done in such a way, however, that the multi-vibrator wave itself does not mix with the recurrent wave in the input circuit leading to the deflecting coil.

Such undesirable mixing may be avoided by utilizing a coupling tube acting as a one way relay. In Fig. 1, a coupling tube 55 is shown having an anode 56 and a cathode 57 connected to the anode 16 and cathode 15, respectively, of multi-vibrator tube 14. The grid 58 of coupling tube 55 is connected to a potentiometer 59 shunted across the input circuit 13 of the oscilloscope. The input circuit of the coupling tube 55 may be traced from the grid 58 through the lower portion of the potentiometer 59, through conductors 61 and 62, through the lower portion of the grid-biasing battery 63 and through the conductor 24 to the cathode 57 of the coupling tube 55.

The output circuit of the coupling tube 55 may be traced from the anode 56, through the conductors 60 and 30, the resistor 27, the conductor 28, the B-battery 25, the conductor 24 to the cathode 57 of tube 55. Thus, the portion of the recurrent voltage across the lower section of the potentiometer 59 is amplified by the tube 55 and appears across the resistor 27 which is a part of the plate circuits of both the multi-vibrator tubes 14 and 18. The synchronizing voltage is thus superposed on the direct voltage which is applied to the plates of the multi-vibrator tubes. The magnitude of the synchronizing voltage is controlled by means of the potentiometer 59.

Although synchronization of the multi-vibrator output and the voltage applied to coil 12 could be accomplished by impressing the synchronizing voltage across some other part of the multi-vibrator circuit than resistor 27, the arrangement illustrated is preferred because it enables the coupling tube 55 to use the same B-battery that supplies the other tube without the necessity of using additional coupling transformers or condensers.

By synchronizing the multi-vibrator with the recurrent phenomena when different harmonics of the multi-vibrator frequency are nearly equal to the frequency of the recurrent wave, it is possible to show different numbers of cycles of the recurrent wave on the fluorescent screen.

It has been found that when the multi-vibrator circuit is made unsymmetrical, it not only increases the useful portion of the curve, thus decreasing the delay between successive sweeps of the cathode beam, but it also makes the multi-vibrator pull into step or synchronize with the wave to be investigated much more readily.

In order to synchronize the multi-vibrator with a voltage impressed upon the input circuit 13, the potentiometer 59 is turned to the "off" position so that no synchronizing voltage is applied to the grid 58 and the condenser 32 is varied until the wave on the fluorescent screen is nearly stationary. When such a condition prevails, one of the harmonic frequencies of the multi-vibrator wave is aproximately equal to the frequency of the voltage in the input circuit. As soon as the harmonic frequency has been so adjusted, the synchronizing voltage is impressed upon the grid 58 by adjusting the potentiometer 59, causing the multi-vibrator to pull into step and to remain there. The recurrent wave now appears on the fluorescent screen of the oscilloscope as a stationary wave in rectangular coordinates.

Various modifications may be made in my invention without departing from the spirit and scope thereof and I desire, therefore, that only such limitations shall be placed thereon as are imposed by the prior art and are set forth in the appended claims.

I claim as my invention:

1. In an electrical apparatus comprising a cathode-ray tube having means for generating a cathode beam and having means for deflecting said beam in one plane and having means for deflecting said beam along a time axis in another plane, a multivibrator circuit which is unsymmetrical and which includes a condenser which charges and discharges as said multivibrator oscillates, a screen-grid vacuum tube connected in series with said condenser, and means for connecting said second deflecting means across said screen-grid tube.

2. Electric apparatus for supplying a timing wave to cathode-ray tubes, said apparatus comprising an unsymmetrical multivibrator circuit having a condenser therein which charges and discharges as said multivibrator oscillates, a vacuum tube connected with its plate impedance in series with said condenser, said vacuum tube being so adjusted that its plate current has a constant value, and means for utilizing the voltage drop across said plate impedance for said timing wave.

3. Electrical apparatus comprising a multivibrator having unsymmetrical plate circuits and having grid-leak resistors, one of said resistors comprising a vacuum tube operated with constant plate current, and means connected across said one resistor for transmitting a timing wave to a cathode-ray tube.

4. An oscilloscope comprising a cathode-ray tube having means for generating a cathode-beam and having means for deflecting said beam in one plane and means for deflecting said beam in a different plane, a multivibrator for supplying a timing wave to one of said deflecting means, said multivibrator being unsymmetrical and comprising coupling condensers and grid-leak resistors, one of said grid leak resistors being so designed that the current flow therethrough is substantially constant for a wide range of voltages applied thereto, said one deflecting means being connected across said one grid-leak resistor.

5. Electrical apparatus comprising a cathode-ray tube having means for generating a cathode beam and having means for deflecting said beam in one plane and means for deflecting said beam in a different plane, and a multivibrator for supplying a variable voltage to one of said deflecting means, said multivibrator comprising two coupling condensers and two grid-leak resistors, said multi-vibrator being unsymmetrical whereby a longer period is required for one of said coupling condensers to discharge than for the other one to discharge, one of said grid-leak resistors being so designed that the coupling condenser connected thereto discharges therethrough at a constant rate, one of said deflecting means being connected across said one grid-leak resistor.

6. Electrical apparatus comprising a cathode-ray tube having means for generating a cathode beam and having means for deflecting said beam in one plane and means for deflecting said beam in a different plane, and an unsymmetrical multi-vibrator having coupling condensers and grid-leak resistors, one of said resistors having a resistance which decreases in substantially direct proportion to the decrease in voltage impressed thereacross, one of said deflecting means being connected across said one resistor.

7. An electrical oscillator for supplying a sawtooth wave to a work circuit, said oscillator comprising an unsymmetrical multivibrator having coupling condensers and having grid-leak means for discharging one of said condensers at a constant rate, said work circuit being connected across said means.

8. An electrical oscillator for supplying a sawtooth wave to a work circuit, said oscillator comprising an unsymmetrical multivibrator having coupling condensers and grid-leak resistors, one of said resistors being a constant-plate-current vacuum tube, one of said condensers and said tube being in a discharge circuit, and means for connecting said work circuit across a portion of said discharge circuit.

9. An oscilloscope comprising a cathode-ray tube having means for generating a cathode-beam and having means for deflecting said beam in one plane and means for deflecting said beam in a different plane, a multivibrator for supplying a timing wave to one of said deflecting means, said multivibrator being unsymmetrical and comprising coupling condensers and grid-leak resistors, one of said grid-leak resistors being so designed that the current flow therethrough is substantially constant for a wide range of voltages applied thereto, said one deflecting means being connected across said one grid-leak resistor, an input circuit connected to the other deflecting means, a vacuum tube having an input circuit and an output circuit, the input circuit of said vacuum tube being connected to said first input circuit, and the output circuit of said vacuum tube being connected to the plate circuit of said multivibrator.

10. Electrical apparatus comprising a cathode-ray tube having means for generating a cathode beam and having means for deflecting said beam in one plane and means for deflecting said beam in a different plane, an unsymmetrical multivibrator comprising vacuum tubes, coupling condensers and grid-leak resistors, one of said condensers and one of said resistors being in a discharge circuit through which the current flow is substantially constant for a certain period, one of said deflecting means being connected across a portion of said discharge circuit, an input circuit connected to the other deflecting means, a vacuum tube having a cathode, an anode, and a grid, said cathode and grid being coupled to said input circuit, said cathode being connected to the cathodes of said multivibrator tubes, and said anode being connected to an anode of one of said multivibrator tubes.

11. Electrical apparatus comprising a cathode-ray tube having means for generating a cathode beam and having means for deflecting said beam in one plane and means for deflecting said beam in a different plane, an unsymmetrical multivibrator having coupling condensers and grid-leak resistors, one of said deflecting means being connected across one of said grid-leak resistors, an input circuit connected to the other deflecting means, a vacuum tube having an input circuit and an output circuit, the input circuit of said vacuum tube being connected to said first input circuit, and the output circuit of said vacuum tube being connected to said multivibrator.

12. An electrical oscillator for supplying a sawtooth wave to a work circuit, said oscillator comprising a multivibrator having coupling condensers and grid leak resistors, one of said resistors being a screen-grid tube having a cathode, an anode, a control grid, and a screen grid, said cathode and said control grid being electrically connected, said screen grid being maintained positive with respect to said cathode, the anode and cathode of said tube forming the terminals of said one resistor.

13. An oscillator for producing a saw tooth wave comprising a capacitor, a source of current, a screen grid tube, means for connecting said elements in series, means for biasing the screen grid of said tube positive relative to the cathode, and means for connecting the control grid of the tube directly to the cathode.

WILLIAM O. OSBON.